March 17, 1970  J. B. ALPER  3,501,757
CONDITION MONITORING AND READOUT DEVICE
Filed Dec. 14, 1965
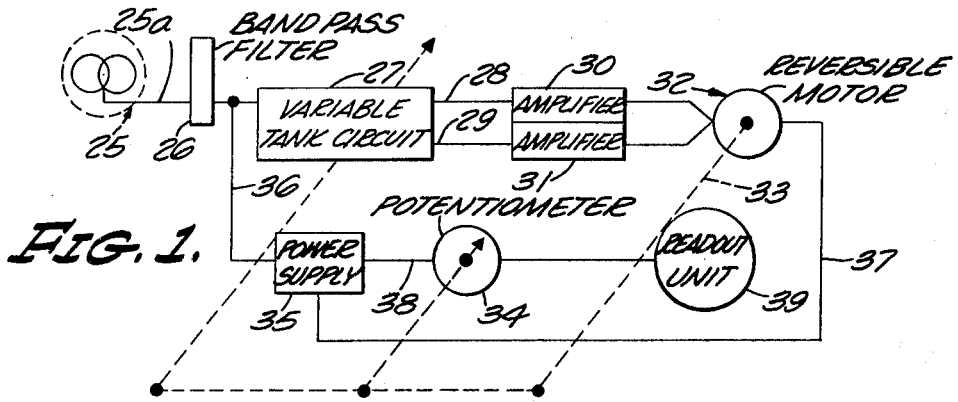
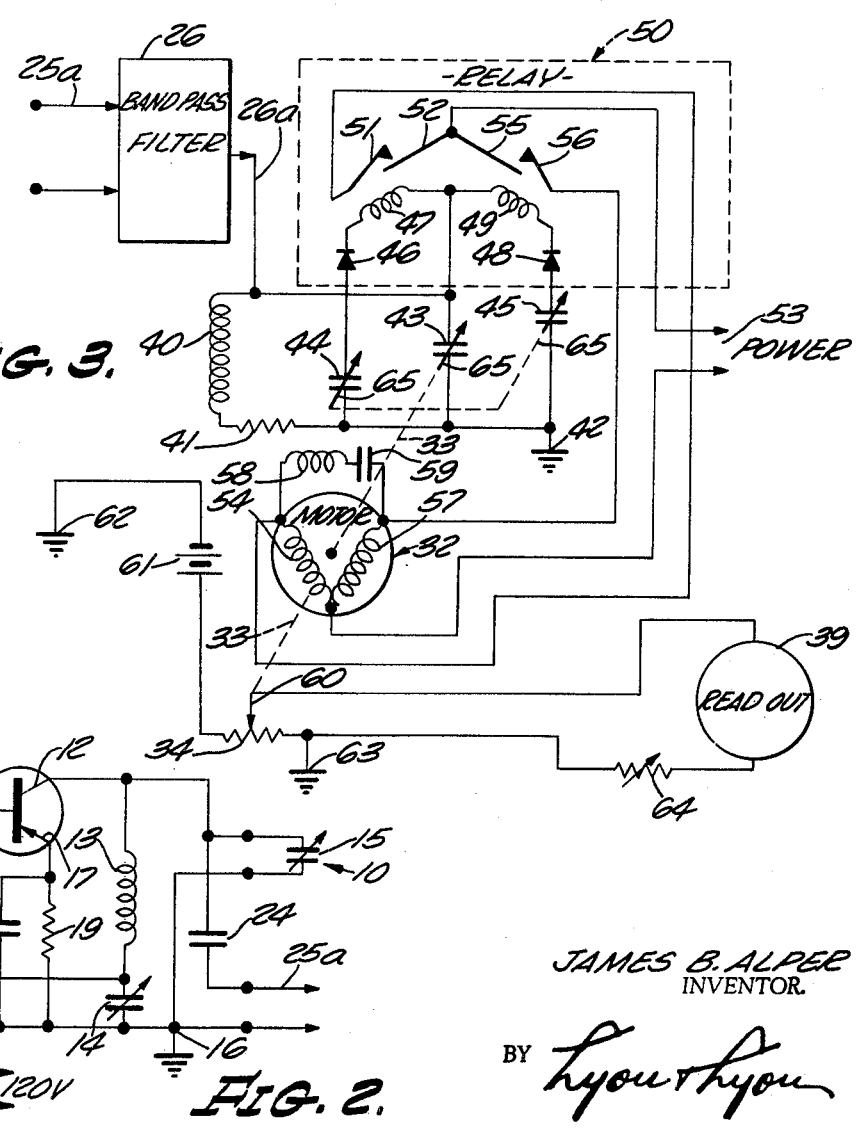
JAMES B. ALPER
INVENTOR.
BY Lyon+Lyon
ATTORNEYS United States Patent Office 3,501,757
Patented Mar. 17, 1970

3,501,757
CONDITION MONITORING AND
READOUT DEVICE
James B. Alper, 127 E. Bunny Ave.,
Santa Maria, Calif. 93454
Filed Dec. 14, 1965, Ser. No. 513,715
Int. Cl. G08c; H03j 3/04, 3/00
U.S. Cl. 340—187         2 Claims

ABSTRACT OF THE DISCLOSURE

A device for monitoring conditions such as the level of a liquid in a tank by means of which extremely accurate measurements can be made and transmitted to a remote location for monitoring. The device includes a reactance type probe which would be responsive to the physical condition to be monitored and which converts the signal to a variable frequency signal which then can be transmitted to a remote location with little line loss and then converted into readable information.

Description

The present invention relates generally to a system for monitoring the various conditions of a system or process occurring at remote locations. More specifically, the present invention is directed to a system for indicating the level of a liquid in a tank, or the temperature, pressure, or flow rate of a material, and further providing a means for controlling that particular condition.

The ensuing description of the present invention will be directed towards the application thereof for monitoring the level of a liquid in a tank. It will be understood, however, that the invention is equally applicable to a system for measuring pressure, temperature, etc. or any condition susceptible of being transduced into an electrical signal having a frequency which is responsive to changes in the particular condition being monitored. A number of such systems have been proposed in the past but have not been satisfactory either because of their inaccuracy or because of their high cost. Some of these prior systems have employed a reactance type probe coupled to a variable frequency oscillator whereby changes in the liquid level will cause a change in the reactance, producing a frequency change and the frequency changes are then indicated by various types of readout devices. Since most of these monitoring systems are employed to check systems at remote locations from the readout, considerable errors are introduced by the cables which connect the probe to the oscillator and readout device. Some of these errors can be lessened by the application of ordinary transmission line techniques but changes in the environment of the transmission line or cable can cause such adjustments to become meaningless. Furthermore, many of the readout systems are unnecessarily complex and costly. A number of devices are well known in the art for indicating frequency, such as counters, ratiometers, frequency meters, etc.

Briefly, the present invention overcomes the difficulties of the prior art by providing a reactance probe coupled directly to a variable frequency oscillator, both of which are contained in the probe housing. It then transmits the frequency signal to a variable tank circuit which produces distinct outputs in response to the frequency of the signal and any change which occurs in that frequency. Detectors operating in response to the distinct outputs retune the variable tank circuit until a null is reached and by determining the amount of returning necessary to reach a null, the frequency values can be indicated directly.

Accordingly, it is an object of the present invention to provide a system for monitoring conditions at remote locations such as those occurring during a manufacturing process wherein the system has increased accuracy and reliability, yet is low in cost.

More specifically, it is an object of this invention to provide a system for telemetering the changes in the level of a liquid in a tank whereby the level can be read with a high degree of accuracy without the necessity of correction for line losses.

It is a further object of this invention to provide a telemetering system employing an improved readout device for measuring frequency change which is accurate, simple and inexpensive.

Further objects and advantages will be apparent upon reading the following detailed description together with the accompanying drawings, in which:

FIGURE 1 is a block diagram of one embodiment of the present system.

FIGURE 2 is a circuit diagram of the probe including the oscillator.

FIGURE 3 is a partial circuit diagram including an illustration of the variable tank circuit, motor and readout unit.

Referring now to the drawings, FIGURE 2 shows a probe 10 of the variable capacitance type. It will be understood that a variable inductance, or a combination of inductance and capacitance may be employed in the probe 10 if desired. Transistor 11 is coupled in a Colpitts-type circuit to form the variable frequency oscillator. The collector 12 of transistor 11 is coupled to the tank circuit consisting of inductor 13, variable capacitor 14 and the variable capacitor 15 of probe 10. Capacitors 14 and 15 are connected in series and the two are coupled in parallel with the inductor 13. The center connection between the capacitors 14 and 15 is connected to ground potential at 16 and feeds back to the emitter 17 of transistor 11 through the bypass capacitor 18 and load resistor 19 which are both coupled to ground potential. The base electrode 20 of transistor 11 is coupled to the source of negative potential 21 through the bias resistor 22. Inductor 13 is also coupled to potential source 21 through lead 23. The output 25a of the oscillator is taken from the collector 12 through the output capacitor 24. The operation of this circuit is conventional and a description thereof is not considered essential. The variable capacitor 14 is provided for adjusting the frequency range of the oscillator.

In FIGURE 1, the combination of the probe 10 and the variable frequency oscillator is shown diagrammatically at 25. Such oscillators frequently produce a variety of upper and lower harmonic frequency oscillations, the presence of which may be detrimental to the accuracy of the variable tank circuit. Accordingly, the output of unit 25 is fed to a bandpass filter 26 which eliminates these harmonic signals. The output of the filter 26 is connected to the variable tank circuit 27. Tank circuit 27 has two output terminals 28 and 29. As long as the frequency signal from the unit 25 remains the same, the voltage levels at terminals 28 and 29 will be equal. Terminals 28 and 29 are coupled to separate amplifiers 30 and 31, the outputs of which are coupled to the reversible motor 32. Motor 32 is of the type having separate windings which produce forward and reverse rotation depending upon which of the windings is energized. An example of such a motor is the Slo-Syn motor manufactured by the Superior Electric Co. of Bristol, Con.

The shaft of motor 32 is shown by the dotted line 33 to be coupled to the variable tank circuit 27 and to a potentiometer 34. The power supply 35 is coupled to the variable tank circuit 27 by the lead 36 and also supplies the reversible motor 32 with power through lead 37. Potentiometer 34 is coupled to power supply 35 through lead 38 or may be coupled to an independent power source if desired. The voltage across the potentiometer 34 is indicated at the readout unit 39, which may then be calibrated in units of volume, weight, percentage, etc., as desired.

Turning now to FIGURE 3, the details of the variable tank circuit 27 will be more readily understood. The output from the bandpass filter 26 is coupled through lead 26a to the inductor 40 which in turn is connected through series resistor 41 to ground potential at 42. Inductor 40 and resistor 41 are connected in parallel with the tuning circuit to form a resonant circuit therewith. This tuning circuit consists of three gang-tuned capacitors 43, 44 and 45. Capacitor 43 is coupled directly in parallel with inductor 40 and resistor 41, whereas capacitor 44 is connected in series with a diode 46 and coil 47. Likewise, capacitor 45 is connected in series with diode 48 and coil 49. Coils 47 and 49 are the control windings of a differential relay generally designated 50. The contacts 51 and 52 connect the external power source 53 and one winding 54 of the reversible motor 32. Similarly, the contacts 55 and 56 of differential relay 50 are coupled through the power source 53 to the other winding 57 of motor 32. Where the source of power 53 is single-phase, a phase shifting network consisting of inductor 58 and capacitor 59 is connected across the windings 54 and 57 of motor 32.

The dotted line 33 indicates the motor shaft is connected to the wiper arm 60 of a potentiometer 34. One terminal of potentiometer 34 is connected to a source of DC potential 61 which is in turn connected to ground 62. The other terminal of potentiometer 34 is connected to ground at 63. The wiper arm 60 is connected to a readout device 39 which is provided with variable resistor 64 for adjustment purposes. The readout device 39 may be a simple voltmeter or similar indicating instrument appropriately calibrated.

The dotted line 33 also indicates that the movable plates 65 of the capacitors 43, 44 and 45 are connected together and driven by the shaft of motor 32. These capacitors are initially set so that capacitor 44 is at a value slightly below that of capacitor 43 and capacitor 45 is slightly greater than capacitor 43 by an equal amount. For example, if capacitor 43 is set at a value C, capacitor 44 would be at ¾C and capacitor 45 set at 5/4C and this would be accomplished by setting the movable plates of capacitors 44 and 45 at ±10 degrees from the plates of capacitor 43. In operation, a stable frequency input through lead 26a will produce three distinct currents through each of the capacitors 43, 44 and 45. The value of capacitor 43 is initially adjusted so that it forms a resonant circuit with inductor 40 and resistor 41 at a frequency which is representative of an average value of the parameter being measured. Capacitors 44 and 45 are then not in resonance with inductor 40 and therefore current through capacitor 43 will exceed in value, the possible currents through capacitors 44 and 45 and therefore no current will flow through either of the diodes 46 or 48. If the incoming frequency rises in response to a rise in liquid livel, capacitor 43 will no longer be in resonance with inductor 40 and the current therethrough will decrease sharply. The capacitor 45 will be closer to resonance and therefore current will be greater in that loop and will flow through diode 48 and coil 49 but will not flow through diode 46. Current through coil 49 will cause the relay contacts 55, 56 to close connecting the power to winding 57 of motor 32. This winding 57 will cause the motor 32 to rotate in a direction which will turn all three shafts 65 of the capacitors until capacitor 43 is once more in resonance. Wiper arm 60 will follow the motor shaft and change the voltage output across potentiometer 34 accordingly. Thus, the voltage level indicated by unit 39 will show the change in frequency which has occurred.

Similarly, when the frequency drops, capacitor 43 is no longer in resonance with inductor 40 and the current therethrough will decrease. The current through capacitor 45 will decrease similarly but current through capacitor 44 will rise as the change in frequency approaches the resonance point for capacitor 44 in the circuit. When current rises in capacitor 44, current will flow through diode 46 and relay coil 47, closing the contacts 51 and 52 which connects the power to the winding 54 of motor 32. This reverses the rotational drive of the capacitor arms 65 readjusting all three of the capacitors until capacitor 43 is once more in resonance with inductor 40. Likewise, this adjusts the voltage output from potentiometer 34 to the readout unit 39.

It will thus be seen that the present invention provides a greatly simplified device for accurately monitoring the level of liquid in a tank or the powder or semisolid in a hopper or other similar conditions. The device is also applicable with the proper sensing unit or probes to measure pressure, flow, temperature, viscosity or other determinations that can cause a change in frequency. The amplifiers 30 and 31 shown in FIGURE 1 may be employed in place of the differential relay 50 described in FIGURE 3. While a specific embodiment of the present invention has been shown and described, it will be obvious to those persons skilled in this art that changes and modifications therein may be made without departing from the scope of this invention. It is the object of the appended claims to cover all such changes and modifications as fall within the true scope and spirit of this invention.

I claim:

1. Apparatus for monitoring a condition existing at a remote location comprising:
   (a) means responsive to said condition and to changes therein, said means comprising a reactance element forming a probe, a variable frequency oscillator providing an alternating signal, said reactance element electrically coupled to said variable frequency oscillator, said reactance element responsive to the magnitude of said condition to vary the frequency of said alternating signal;
   (b) detecting means coupled to said oscillator, said detecting means comprising three parallel resonant circuits including variable circuit elements, the variable element in a first one of said circuits being adjusted to produce resonance at a predetermined frequency, the variable element in the second one of said circuits being adjusted to produce resonance at a frequency slightly less than said predetermined frequency, the variable element in the third one of said circuits being adjusted to produce resonance at a frequency slightly higher than said predetermined frequency, means connected in series with said second and third circuit elements, each of said means operative to provide an output signal when said alternating signal frequency produces resonance in the respective circuit;
   (c) tuning means coupled to said detecting means to receive said outputs, said tuning means including adjusting means ganging together said variable circuit elements, said tuning means responsive to said output signals to tune said circuit elements to obtain resonance in said first circuit; and,
   (d) indicating means coupled to said tuning means responsive to the amount of tuning of said detecting means, said indicating means providing a readout calibrated in units of magnitude of the condition monitored.

2. Apparatus for monitoring a condition existing at a remote location comprising:
   (a) means responsive to said condition and to changes therein, said means comprising a reactance element forming a probe, a variable frequency oscillator providing an alternating signal, said reactance element electrically coupled to said variable frequency oscillator, said reactance element responsive to the magnitude of said condition to vary the frequency of said alternating signal;

(b) detecting means coupled to said oscillator, said detecting means comprising three parallel resonant circuits having a plurality of variable circuit elements, the variable element of a first one of said circuits being adjusted to produce resonance at a predetermined frequency, the variable element of the second one of said circuits being adjusted to produce resonance at a frequency slightly less than said predetermined frequency, the variable element of the third one of said circuits being adjusted to produce resonance at a frequency slightly higher than said predetermined frequency, means connected in series with said second and third circuit elements, each of said means operative to provide an output signal when said alternating signal frequency produces resonance in the respective circuit:

(c) tuning means coupled to said detecting means, said tuning means comprising a reversible motor, said motor electrically coupled to receive said output signals, said motor having a shaft connected to each of said variable circuit elements, said motor responsive to one of said signals to vary said circuit elements to obtain resonance of said first circuit; and (d) indicating means coupled to said tuning means, said indicating means including a potentiometer, said potentiometer coupled to said motor shaft, said potentiometer electrically coupled to readout means calibrated in units of magnitude of the condition monitored.

References Cited

UNITED STATES PATENTS

| | | | |
|---|---|---|---|
| 2,165,510 | 7/1939 | Rosene | 340—200 |
| 2,423,617 | 7/1947 | Rath | 340—200 |

THOMAS B. HABECKER, Primary Examiner

U.S. Cl. X.R.

334—16, 25; 340—207